United States Patent [19]

Epstein et al.

[11] Patent Number: 5,075,893
[45] Date of Patent: Dec. 24, 1991

[54] UNPOLARIZED LASER OSCILLATORS

[75] Inventors: Harold M. Epstein, Columbus; Jeffrey L. Dulaney, Hilliard, both of Ohio

[73] Assignee: Battelle Memorial Institute, Columbus, Ohio

[21] Appl. No.: 626,587

[22] Filed: Dec. 7, 1990

[51] Int. Cl.$^5$ .............................................. H01S 3/081
[52] U.S. Cl. ..................................... 372/108; 372/10; 372/94; 372/99; 372/106
[58] Field of Search .................. 372/94, 99, 105, 106, 372/10–12, 108, 18–19, 30; 356/349, 350

[56] References Cited

U.S. PATENT DOCUMENTS

| | | | |
|---|---|---|---|
| 3,869,210 | 3/1975 | Fletcher et al. | 356/350 |
| 3,928,818 | 12/1975 | White | 372/33 |
| 4,546,477 | 10/1985 | Richards | 372/12 |
| 4,617,665 | 10/1986 | Mourou et al. | 372/18 |
| 4,715,689 | 12/1987 | O'Meara et al. | 350/354 |
| 4,802,176 | 1/1989 | O'Meara | 372/19 |
| 4,815,080 | 3/1989 | Chesnoy et al. | 372/30 |
| 4,899,345 | 2/1990 | Cyr et al. | 372/32 |
| 4,904,041 | 2/1990 | Izadpanah | 350/96.15 |

OTHER PUBLICATIONS

Blow et al., "Experimental Demonstration of Optical . . . ", Opt. Lett., vol. 14(14), Jul. 15, 1989, pp. 754–756.

Primary Examiner—William L. Sikes
Assistant Examiner—Galen J. Hansen
Attorney, Agent, or Firm—Philip M. Dunson

[57] ABSTRACT

Apparatus 10 (FIG. 2) for providing coherent radiation 12 that is not polarized, comprises a laser pump cavity 14 for providing a beam of unpolarized coherent radiation 12 in a predetermined first direction (upward); a polarizer 15, for breaking down the radiation 12 into two linearly polarized orthogonal components, 12A,12B, transmitting one component 12A through it in the first (upward) direction, and reflecting the other component 12B from it in a second direction (upper right); mirrors 17,18,19 for reflecting the component 12A along a first closed path 15,17,18,19,15 (clockwise) that ends in directing it back to the polarizer 15 in a third direction (lower left), opposite to the second direction, and for reflecting the component 12B along a second closed path 15,19,18,17,15 (counterclockwise) opposite to the first closed path 15,17,18,19,15, that ends in directing it back to the polarizer 15 in a fourth direction (downward), opposite to the first direction; a Q-switch 16 (for pulsed radiation) or a quarter wave plate 23 (for continuous wave radiation) in the closed paths 15,19,18,17,15; 15,17,18,19,15 for retarding each component 12A,12B of the radiation by a predetermined fraction of a wavelength, so that a substantial fraction of each component 12A,12B is transformed into the opposite component 12B,12A before reaching the polarizer 15; so that each transformed component is directed from the polarizer 15 in the fourth (downward) direction to the laser pump cavity 14 to maintain oscillation therein; and so that the fraction of each component 12A,12B that remains not transformed is directed from the polarizer 15 in the third direction (lower left); and thus so that the two last mentioned components 12A,12B combine to form a beam 12T of unpolarized useful output radiation $E_{out}$ that is directed in the third direction (lower left).

9 Claims, 2 Drawing Sheets

UNPOLARIZED LASER OSCILLATORS

This invention was made with Government support under Contract DAAH01-88-C-0481 awarded by the United States Army Missile Command. The Government has certain rights in this invention.

FIELD

This invention relates to oscillators for providing coherent radiation that is not polarized. It has to do particularly with such laser oscillators that are also free of stress birefringence losses, a common cause of beam nonuniformity. The invention is especially useful for applications in which high power coherent radiation is required.

In some typical embodiments of the invention, the pattern of the laser beam in each pass flip-flops, becoming a mirror image of the pattern of the preceding pass, and thus providing substantially uniform output. In other typical embodiments, the pattern of each beam rotates about its axis by at least a few degrees in the same direction from each pass to the next, and thus provides even greater uniformity of output.

The invention is useful in methods and apparatus such as those in the copending United States patent application of Harold M. Epstein et al, Ser. No. 07/463,577, filed Jan. 11, 1990, for Improving Material Properties.

BACKGROUND

The standard laser oscillator configuration, as in FIG. 1, has several disadvantages for high power operation:

a. A Maltese cross pattern is produced when the laser is Q-switched. This can be partially corrected by placing a half wave plate between two rods, but this requires an extra component and puts some operational limitations on the system.

b. Stress birefringence in the rod causes a substantial loss in efficiency. This can be corrected by inserting the rejected polarization back into the beam with another dielectric polarizer, but this requires several extra components including an extra dielectric polarizer which has a high susceptibility to damage.

c. Losses due to stress birefringence in the pockels cell or incomplete Q-switching cannot be recovered.

d. Losses of a few percent per pass by reflection of the polarization that should be transferred through the dielectric polarizer cannot be recovered.

The present invention eliminates all four of the above drawbacks in the standard configuration, and has some additional advantages.

DISCLOSURE

The Q-switch (pockels cell) time sequence operation of the oscillator shown in FIG. 2 is the following:

At time $t_0$ the flashlamps are fired. There is no voltage on the pockels cell at $t_0$. The transmitted polarization travels around the ring in the clockwise direction and is transmitted out when it strikes the polarizer again. The reflected polarization travels around the ring in the counterclockwise direction and is reflected out when it strikes the polarizer again. The cavity is open with no voltage on the pockels cell, and energy is stored in the rod. At time $t_1$, voltage is applied to the pockels cell. When quarter wave voltage is applied, half of the beam is transmitted and half is reflected. This is equivalent to a fifty percent output coupler. Lower voltage lowers the effective reflectivity and higher voltage increases it.

Since the beam is unpolarized going through the rod, there is no stress birefringence loss to cause nonuniformity in the beam. Likewise the cavity can have no unwanted losses due to reflections from the polarizer. This configuration has several advantages:

A. The pockels cell can be operated at the lowest voltage consistent with the desired output, minimizing the recirculating energy in the cavity, and improving the lifetimes of the polarizer and the pockels cell.

B. In addition to the improvement in uniformity arising from the elimination of the Maltese cross, the beam pattern flips top to bottom, or side to side, with each pass, as shown in FIG. 3.

C. No output couplers are needed. A conventional system requires a large array of output couplers.

D. This configuration can operate in the cavity dump mode without modification if the pockels cell is operated at half wave voltage for a buildup time of typically several photon transit times.

For continuous wave operation, a half wave plate can be substituted for the pockels cell. Rotation of the plate produces effective output coupler reflectivities between 1 and 0. A quarter wave plate produces effective reflectivities between 0.5 and 0.

DRAWINGS

CARRYING OUT THE INVENTION

Figure 1:
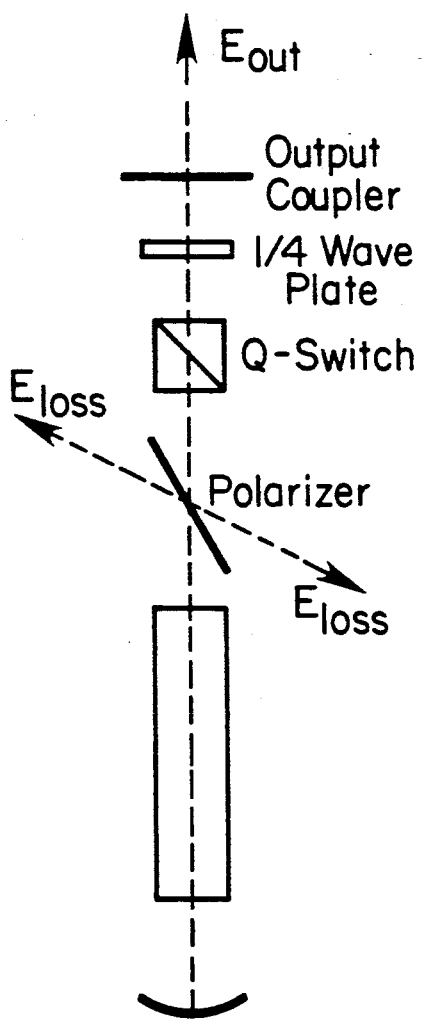
FIG. 1 is a schematic plan view showing a typical standard laser oscillator configuration in the prior art.

Referring again to FIG. 2, with the quarterwave retarder plate 23 either removed or positioned so as not to affect the radiation passing through it, the sequence of operation in more detail is the following:

At time $t_0$, the flashlamps (not shown) in the laser pump cavity 14 are fired with no voltage on the pockels cell 16. The transmitted polarization 12A travels around the ring of mirrors in the clockwise direction 17,18,19, and is transmitted out at the polarizer 15, as indicated at 12T. So the cavity is open for the transmitted polarization 12A, and cannot lase. In a similar manner, the reflected polarization 12B travels around the ring of mirrors in the counterclockwise direction 19,18,17, and it is reflected out at the polarizer 15, as indicated at 12T. So the cavity is also open for this polarization 12B, and cannot lase.

At time $t_1$, after the flashlamps have been on for typically several hundred (e.g. about 100 to 500) microseconds, the pockels cell 16 receives a voltage of typically about 1 to 4 kilovolts, causing about a tenthwave to a quarterwave retardation in the path of each polarization of radiation described above. So the 12A polarized radiation passing upward through the pockels cell 16 is transformed into the 12B polarization, and is reflected by the mirrors 17,18,19 in the clockwise direction to the polarizer 15 from which it is reflected back to the rear mirror 13. Meanwhile the 12B polarized radiation passing downward through the pockels cell 16 is transformed into the 12A polarization and is transmitted through the polarizer 15 back to the rear mirror 13. This closes the cavity for both polarizations when the stored energy in the gain medium (the rod 20) has built up to the desired level. The rear mirror of the cavity is the concave mirror 13, and the polarizer 15 is the effective output coupler.

The fraction of energy coupled out at each pass is determined by the voltage on the pockels cell 16. For a KD*P (deuterated potassium dihydrogen phosphate) cell, half of the energy is coupled out at about 3.3 kilovolts, and none of the energy couples out at about 6.6 kilovolts. (Conventionally Q-switched oscillators (as in FIG. 1) operate with about 20 to 50 percent of the energy removed by the output coupler.) The voltage remains on the pockels cell typically for a few (e.g. about 0.1 to 10) microseconds.

The contrast ratio of a typical dielectric polarizer is much better for the transmitted beam than for the reflected beam. The poor contrast ratio of the reflected beam allows energy to leak out of the oscillator during the charging period. This problem can be corrected by using two dielectric polarizers, with their polarizer surfaces adjacent, typically about 0.1 to 1 millimeter apart. The other surfaces must be antireflection coated, because the usual Brewster angle geometry to prevent loss of the desired polarization is not effective in a cavity with both polarizations.

The coherent radiation 12 is generated by an oscillator 10 (all of FIG. 2) comprising a rear mirror 13, a laser pump cavity 14, a polarizer 15, a pockels cell 16, and three mirrors 17,18,19. The laser pump cavity 14 comprises a gain medium, such as at least one neodymium-glass laser rod 20 pumped by flashlamps (not shown), that are driven by a pulse forming network (PFN) (not shown). One such laser pump cavity 14 that has been used conveniently in the oscillator 10 comprises the following components manufactured by Compagnie Generale Electrique, of France CGE-640 laser cavity, 67 centimeters long, helical flashlamps 64 millimeters × 670 millimeters laser rod with 1 percent Nd doping. Antireflection coated at both ends.

8 Helical flashlamps

For simplicity, the drawings show only one laser rod 20. We typically use two of the rods described above, and any convenient number may be employed. The rear mirror 13 typically may be either planar or spherical. A spherical mirror with 100 percent reflectivity and a 20 meter radius of curvature is convenient in combination with the above equipment.

The oscillator 10 provides a fluorescence envelope. The coherent radiation 12 from the laser pump cavity 14 is unpolarized. The polarizer 15 breaks the radiation 12 down into two linearly polarized orthogonal components 12A,12B; one of which (component A) it transmits in the clockwise direction, as indicated at 12A; and the other (component B) it reflects to the right in the counterclockwise direction, as indicated at 12B; to the pockels cell 16.

With a proper potential present across it (about 1 to 4 kilovolts for a cell of transverse deuterated potassium dihydrogen phosphate), the pockels cell 16 retards the coherent radiation component 12A while transmitting it on in the clockwise direction to the mirrors 17,18,19, and thence to the polarizer 15, which reflects a fraction of it back through the rod 20, to the rear mirror 13 and transmits the remainder 12T to the target, as indicated at $E_{out}$. The reflected radiation component 12B proceeds back in the counterclockwise direction by way of the mirrors 19,18,17 and thence through the pockels cell 16, with a retardation, to the polarizer 15, which transmits a fraction of it back through the rod 20 to the rear mirror 13 and reflects the remainder 12T to the target, as indicated at $E_{out}$.

When the flashlamps are originally fired, no voltage is on the pockels cell 16. Neither the clockwise 12A nor the counterclockwise 12B radiation component can return to the rear mirror 13, because all of the energy exits the cavity; being either transmitted (12A) or reflected (12B), by the polarizer 15, away from the rod 20, as indicated at 12T and $E_{out}$. During this time, energy builds up on the rod 20. After about 100 to 500 microseconds, voltage is applied to the pockels cell 16 to initiate the laser pulse. Voltage is removed from the pockels cell 16 after about 0.1 to 10 microseconds.

An appendix filed with the application from which this patent issued, and present in the file of the application, comprises some illustrations demonstrating advantages of the present invention. FIG. 5-22 in the appendix comprises two burn patterns. The upper pattern shows the Maltese cross pattern obtained from a typical linear Q-switched oscillator of the prior art, as shown in FIG. 1 of this patent; while the lower pattern, labeled "P-Oscillator Output", shows the substantially uniform cross section of the output beam $E_{out}$ of a typical Q-switched oscillator 10 according to the present invention as shown in FIG. 2 of this patent.

The Maltese cross pattern from the linear oscillator as in FIG. 1 is illustrated also in the appendix by two computer generated representations (FIG. 5-19) in the appendix, the upper pattern being a pictorial view with height indicating intensity, and the lower pattern showing a cross section of the beam with horizontal contour lines indicating equal intensities.

Figure 2:
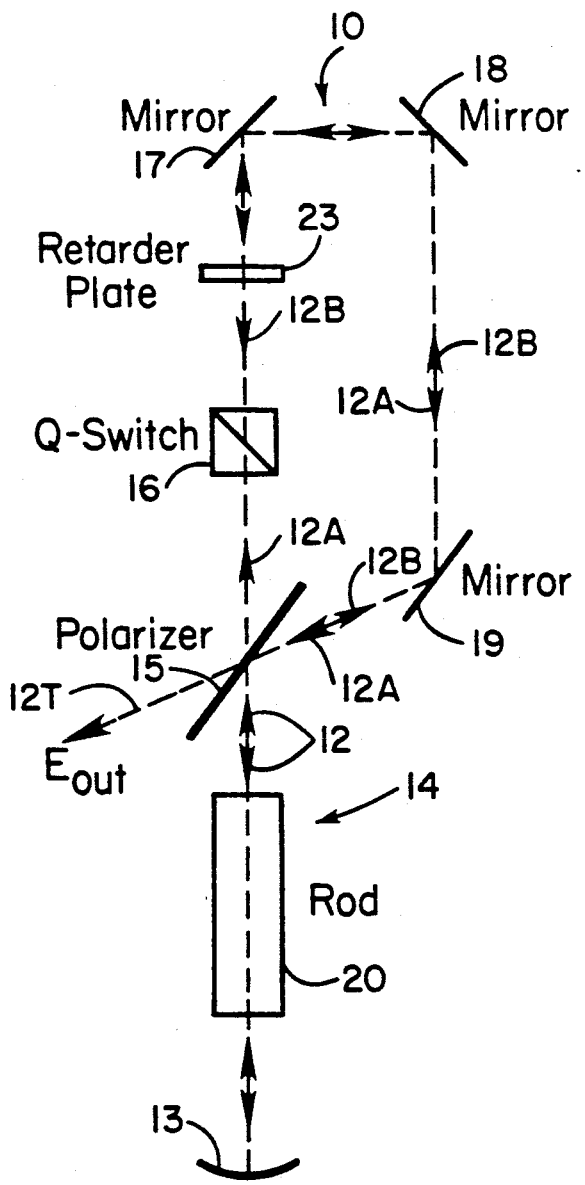
FIG. 2 is a schematic plan view illustrating typical embodiments of apparatus according to the present invention.
Figure 4:
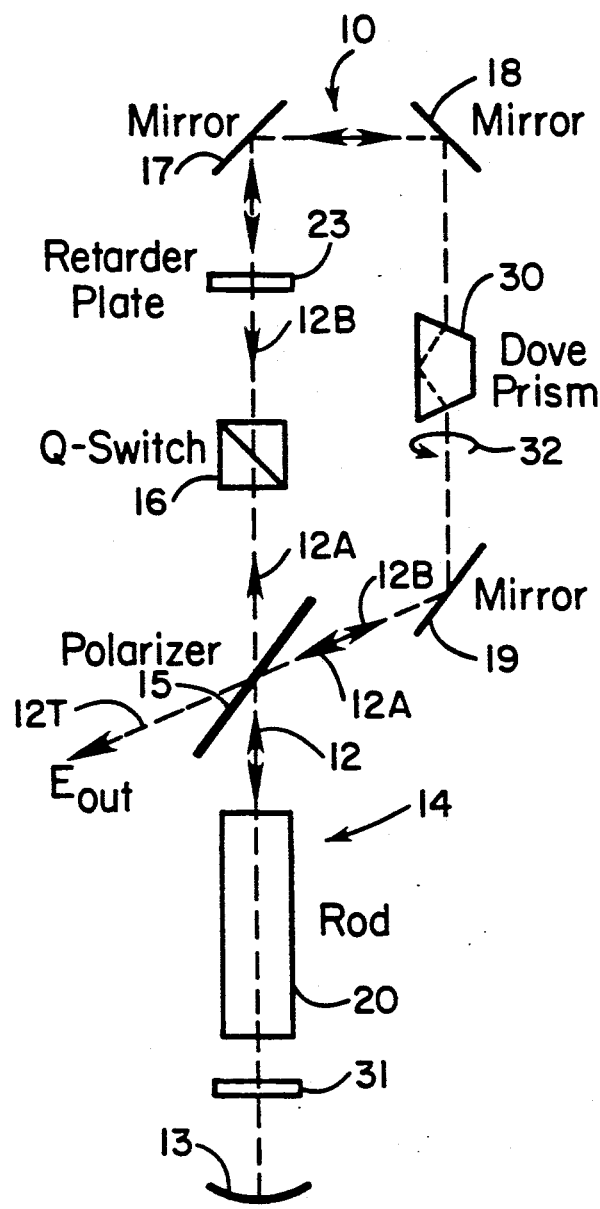
FIG. 4 is a schematic plan view illustrating typical embodiments of apparatus according to the invention that are generally similar to those of FIG. 2 and include additional devices to provide another advantageous characteristic.
Figure 3:
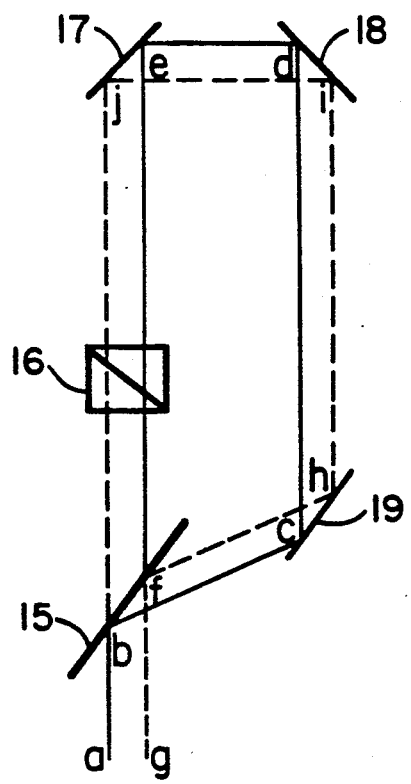
FIG. 3 is a similar view of part of the apparatus as in FIG. 2, illustrating an advantageous characteristic thereof.

The uniformity of the output beam from an oscillator according to the present invention, which we have dubbed the "P-Oscillator" because of its P-shaped arrangement apparent from FIGS. 2 and 4, is achieved largely because of the fact that the output 12T comprises the combination of both components 12A,12B of the radiation 12 from the laser pump cavity 14, as explained above. Moreover, the uniformity is enhanced by virtue of a feature inherent in the invention that is illustrated in FIG. 3; namely the pattern of the beam in each pass is flip-flopped left and right (as viewed in FIGS. 2 and 3) from the pattern of the preceding pass, as is explained below.

In the first pass of the beam 12, the component 12B at the left side of the beam 12, shown as a solid line following the counterclockwise inner path abcdef, is transformed between e and f (by the pockels cell 16) to the component 12A, and is transmitted down through the polarizer 15 from f to g.

This 12A component (on the right side of the beam 12) is reflected back up from the rear mirror 13 (This is the second pass.) from g to f where it is transmitted up through the polarizer 15. Then it is transformed by the pockels cell 16 into the component 12B, which proceeds along the clockwise inner path edcb (solid line)

and is reflected down by the polarizer 15 from b to a and thence to the rear mirror 13.

In the next (third) pass, this 12B component (now again on the left side) is reflected back along the path abcdefg in the same manner as described above for the component 12B at the left side of the beam 12 in the first pass.

Similarly, the description for the fourth pass is the same as the description above for the second pass, the description for the fifth pass is the same as that for the third pass, and so on for the subsequent passes.

In the first pass of the beam 12, the component 12B at the right side of the beam 12, shown as a dashed line following the counterclockwise outer path gfhijb, is transformed between j and b (by the pockels cell 16) to the component 12A, and is transmitted down through the polarizer 15 from b to a.

This 12A component (on the left side of the beam 12) is reflected back from the rear mirror 13 (This is the second pass.) from a to b where it is transmitted up through the polarizer 15. Then it is transformed by the pockels cell 16 into the component 12B, which proceeds along the clockwise outer path jihf (dashed line) and is reflected down by the polarizer 15 from f to g and thence to the rear mirror 13.

In the next (third) pass, this 12B component (now again on the right side) is reflected back along the path gfhiJb in the same manner as described above for the component 12B at the right side of the beam 12 in the first pass.

Similarly, the description for the fourth pass is the same as the description above for the second pass, the description for the fifth pass is the same as that for the third pass, and so on for the subsequent passes.

The descriptions for the 12A component on each side of the beam 12 in the first pass are the same as those for the second pass above, the descriptions for the second pass are the same as those for the third pass above, and so on in the same manner.

To summarize, each component starting on each side of the beam in each pass returns to the rear mirror 13 as the opposite component at the opposite side of the beam, and starts as such from there in the next pass. Thus both components flip-flop from side to side with each successive pass, and any side to side nonuniformity is substantially eliminated.

For continuous wave operation, the quarter wave plate 23 is inserted into the ring portion 15-19 of the oscillator 10 as shown in FIG. 2. The Q-switch 16 (pockels cell) serves no purpose for continuous wave operation. Ordinarily the pockels cell is omitted where the oscillator is to be used only for continuous wave operation, but it may be included, as shown in FIG. 2, where it is desired to change quickly to the pulsed mode of operation. The voltage to the pockels cell 16 of course would remain off during the continuous wave operation. The quarter wave plate 23 may be left in the cavity during pulsed operation if it is rotated to a null position. The angular position of the plate 23 determines the effective output coupler reflectivity. The null position still yields a substantial amount of energy, and poor isolation of one polarization can cause spikes in the output. This is not a problem for continuous wave operation. The quarter wave position yields the smoothest output and the most energy. (FIG. 5-24 in the appendix illustrates these facts.)

A standard oscillator exhibits output beam angular nonuniformity due to pumping nonuniformities. Typical pump cavity configurations include a single ellipse cavity with the flashlamp at one focal axis of the cylindrical ellipse and the laser rod at the other. This geometry is efficient because rays from one focal axis intercept the other focal axis. However, most of the pump radiation strikes the side of the rod adjacent to the lamps. This nonuniformity can be partially smoothed by forming the pump cavity from multiple partial ellipses, each with a lamp, but there remains a scallop effect, and complexity of the cavity increases. Another typical configuration comprises a close coupled cavity without elliptical focusing. The highest pump intensity still occurs in the areas of the rod adjacent to the lamps.

The apparatus shown in FIG. 4 provides coherent radiation that is free from any angular nonuniformities except possibly a negligible amount. It contains all of the equipment shown in FIG. 2 plus a dove prism 30 in the closed paths 15,17,18,19,15; 15,19,18,17,15 and a retarder plate 31, preferably a quarterwave plate, between the rear mirror 13 and the laser rod 20. The operation is the same as that described above for FIG. 2 except that the pattern of the laser beam in each pass instead of flip-flopping from the pattern of the preceding paths, rotates about its axis by at least a few degrees in the same direction from each pass to the next, and thus provides even greater uniformity of output than does the apparatus of FIG. 2.

The closed paths 15,17,18,19,15; 15,19,18,17,15 lie on a plane (the plane of the paper on FIGS. 2 and 4) and the dove prism 30 is located with its axis along a portion of the closed paths and with the normal to its base at an angle away from the plane of the closed paths, as indicated at 32. This causes each component of radiation 12A,12B to proceed out of the plane of the closed paths and then back into it as it passes through the dove prism 30, and thus causes the beam to rotate by an angle that is approximately twice the angle between the plane of the closed paths and the normal to the base of the dove prism. The fraction of the rotated beam that is directed by the polarizer 15 back through the rod 20 and the quarter wave plate 31 is reflected by the rear mirror 13 so that the component 12A,12B that was directed down is reflected back up by the rear mirror 13 and thus passes through the quarter wave retarder plate 31 and the rod 20 a second time, so that the next radiation beam 12 is retarded by a half wavelength and thus each component 12A,12B returns upward to the polarizer 15 as the same component as in the preceding pass around the closed paths. So with each pass around the closed paths the beam is rotated by the same amount and in the same direction, so that after several passes it has made a complete rotation and continues in the same manner, providing an extremely high degree of angular uniformity in the output beam.

Figure 5:
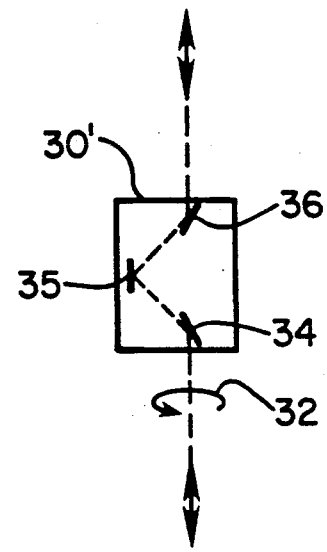
FIG. 5 is a schematic view of an alternative device for one of the devices in FIG. 4.

The apparatus of FIG. 5 operates in the same manner with the combination 30' of mirrors 34,35,36 in the closed paths instead of the dove prism 30. The unit 30' is positioned similarly to the dove prism 30 as described above. The unit 30' is positioned so that the normal to each mirror 34,35,36 is at an angle, typically at least about 2.5 degrees to the plane of the closed paths, and rotates each component 12A,12B of the beam by twice that angle, as explained before for the dove prism.

To summarize in the format and terminology of the claims, typical apparatus 10 for providing coherent radiation 12 that is not polarized, comprises A. laser means 14 for providing a beam of unpolarized coherent radiation 12 in a predetermined first direction (upward in FIG. 2);

B. polarizing means 15 located in the path of the beam 12, for breaking down the radiation 12 into two linearly polarized orthogonal components 12A,12B, transmitting one component 12A through it in the first (upward) direction, and reflecting the other component 12B from it in a predetermined second direction (upper right in FIG. 2);

C. means 17,18,19 for reflecting the component 12A that was transmitted through the polarizing means 15, along a first closed path 15,17,18,19,15 (clockwise in FIG. 2) that ends in directing it back to the polarizing means 15 in a predetermined third direction (lower left in FIG. 2), opposite to the second direction, and for reflecting the component 12B that was reflected from the polarizing means 15, along a second closed path 15,19,18,17,15 (counterclockwise in FIG. 2) that is opposite to the first closed path 15,17,18,19,15, and ends in directing it back to the polarizing means 15 in a predetermined fourth direction (downward in FIG. 2), opposite to the first direction;

D. means (16 for pulsed radiation; 23 for continuous wave radiation) located in the closed paths 15,19,18,17,15; 15,17,18,19,15 for retarding each component 12A,12B of the radiation by a predetermined fraction of a wavelength (typically about 0.1 to 0.25 wavelength for pulsed radiation, and about 0.1 to 0.4 wavelength for continuous wave radiation), so that a substantial fraction (typically about 10 to 50 percent for pulsed radiation, and about 10 to 90 percent for continuous wave radiation) of the transmitted component 12A is transformed into the opposite component 12B before reaching the polarizing means 15, and so that a substantial fraction (typically the same ranges as above) of the reflected component 12B is transformed into the opposite component 12A before again reaching the polarizing means 15;

E. so that the transformed transmitted component (now 12B) is reflected from the polarizing means 15 in the fourth (downward) direction to the laser means 14 to maintain oscillation therein, and the transformed reflected component (now 12A) is transmitted through the polarizing means 15 in the fourth (downward) direction to the laser means 14 to maintain oscillation therein; and F. so that the fraction of the transmitted component 12A that remains not transformed is transmitted through the polarizing means 15 in the third direction (lower left), and the fraction of the reflected component 12B that remains not transformed is reflected from the polarizing means 15 in the third direction (lower left); and thus G. so that the two last mentioned components 12A,12B combine to form a beam 12T of unpolarized useful output radiation $E_{out}$ that is directed in the third direction (lower left).

The laser means -A typically comprises a laser pump cavity 14 including a gain medium 20 pumped by flashlamps that are driven by a pulse forming network, and the gain medium typically comprises at least one neodymium-glass laser rod.

The polarizing means B typically comprises a dielectric polarizer; and preferably it comprises two dielectric polarizers, with their polarizer surfaces adjacent and about 0.1 to 1 millimeter apart, and wherein the other surfaces are antireflection coated. Typically the reflecting means C comprises a plurality of planar mirrors.

For pulsed radiation, the retarding means typically comprises means for retarding each component 12A,12B of the radiation by about a tenth to a quarter wavelength, so that about 10 to 50 percent of the transmitted component 12A is transformed into the opposite component 12B before again reaching the polarizing means 15, and so that about 10 to 50 percent of the reflected component 12B is transformed into the opposite component 12A before reaching the polarizing means 15; and it typically comprises a pockels cell. The apparatus typically comprises also means for firing the flashlamps, means for applying about 1 to 4 kilovolts to the pockels cell 16 about 100 to 500 microseconds after the flashlamps are fired, and means for removing the voltage from the pockels cell 16 about 0.1 to 10 microseconds thereafter.

For continuous wave radiation, the retarding means D typically comprises means for retarding each component 12A,12B of the radiation by about one-tenth to four-tenths wavelength, so that about 10 to 90 percent of the transmitted component 12A is transformed into the opposite component 12B before reaching the polarizing means 15, and so that about 10 to 90 percent of the reflected component 12B is transformed into the opposite component 12A before again reaching the polarizing means 15; and it typically comprises a quarter wave retarder plate.

Typically embodiments of the invention apparatus comprise also H. means (typically either a dove prism 30 (as in FIG. 4) or an optically equivalent arrangement 30 of mirrors 34,35,36 (as in FIG. 5) located in the closed paths 15,17,18,19,15; 15,19,18,17,15 for rotating the beam of radiation 12 about its axis (typically at least about 5 degrees); and I. means 31 (typically a (preferably quarter wave) retardation plate) in the laser means 14 for retarding the radiation beam 12 from each pass through the closed paths to the next pass therethrough by a predetermined fraction of a wavelength (typically by about ⅛ to ⅜ (preferably about ¼) wavelength per one-way pass through the retarding means in each direction; i.e. about ¼ to ¾ (preferably about ½) wavelength total retardation per two-way pass through the retarding means); and thus J. so that the radiation beam 12 is rotated from each pass through the closed paths to the next pass therethrough by a predetermined angle (typically at least about 5 degrees).

In some such embodiments (as in FIG. 4), the closed paths typically lie in a plane, and the rotating means H comprises a dove prism 30 located with its axis along a portion of the closed paths and with the normal to its base at an angle away from the plane of the closed paths (as indicated at 32). The angle typically is at least about 2.5 degrees.

In some other such embodiments (as in FIG. 5), the closed paths typically lie in a plane and the rotating means H comprises a plurality of mirrors 34,35,36 positioned in a portion of the closed paths, including a first mirror 36 positioned to reflect the component of radiation 12A or 12B travelling in a first direction away from the plane of the paths to at least one intermediate mirror 35 positioned to reflect it back toward the paths to a last mirror 34 positioned to reflect it on in the first direction along the paths, and thus rotating this component; the mirrors 34,35,36 thus in a reciprocal manner also reflecting the other component 12B or 12A travelling in the opposite second direction from the last mirror 34 via the at least one intermediate mirror 35 to the first mirror 36, and on in the second direction along the paths, and thus rotating that component. Typically the angle between the normal to each mirror 34,35,36 and the plane of the closed path (as indicated at 32) is at least about 2.5 degrees.

The retarding means typically comprises means 31 for retarding the radiation beam 12 by about one-eighth to three-eighths wavelength per one-way pass in each direction therethrough, and thus for retarding it by about one-fourth to three-fourths wavelength per two-way pass therethrough. Typical retarding means I comprises a quarter wave retarder plate 31, which preferably is positioned so as to retard the radiation beam 12 by about one-quarter wavelength per one-way pass in each direction therethrough, and thus to retard it by about one-half wavelength per two-way pass therethrough.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

We claim:

1. Apparatus for providing unpolarized coherent radiation comprising:

Laser means (14) for providing a beam of unpolarized coherent radiation (12) along a beam path in a predetermined first direction;

Polarizing means (15) located in said beam path for dividing the radiation into first and second linearly polarized orthogonal components (12A,12B), transmitting the first component (12A) through the polarizing means along a transmitted path in the first direction, and reflecting the second component (12B) from the polarizing means along a reflected path in a predetermined second direction;

Reflecting means (17,18,19) for reflecting the transmitted first component (12A) and the reflected second component (12B) in opposite directions around a closed path (15,17,18,19,15) which includes said transmitted path and said reflected path;

First retarding means (16 for pulsed radiation; 23 for continuous radiation) located in said closed path for retarding each of said first and second components by a predetermined first fraction of a wavelength, such that a substantial fraction of said first component is transformed into a third component having the same polarization as said second component, and a substantial fraction of said second component is transformed into a fourth component having the same polarization as said first component;

Rotating means (30 or 30') located in a section of the closed path for spatially rotating said first, second, third, and fourth components through a predetermined angle about an axis defined by said section of the closed path;

Said third component being reflected from the polarizing means in a third direction along said beam path and opposite to the first direction, back to said laser means to maintain oscillation therein, and said fourth component being transmitted through the polarizing means in the third direction to said laser means to maintain oscillation therein;

Said first and second components being respectively transmitted and reflected out of said closed path to form a combined output beam (12T) of unpolarized output radiation directed in a fourth direction opposite to said second direction;

Said laser means including a resonant cavity comprising a first reflector and a second reflector, said second reflector comprising said reflecting means, said polarizing means, and said first retarding means; said laser means further including a second retarding means located in said resonant cavity outside said second reflector for retarding the radiation within said resonant cavity by a predetermined second fraction of a wavelength.

2. Apparatus as in claim 1, wherein said angle of said rotating means is at least about five degrees.

3. Apparatus as in claim 1, wherein the closed path lies in a plane, and the rotating means comprises a dove prism (30) located with its axis along a portion of the closed path and with the normal to its base at an angle away from the plane of the closed path.

4. Apparatus as in claim 3, wherein the angle between the normal to the base of the dove prism and the plane of the closed paths is at least about 2.5 degrees.

5. Apparatus as in claim 1, wherein said closed path lies in a plane, and said rotating means comprises a plurality of mirrors (34,35,36).

6. Apparatus as in claim 5, wherein the angle between the normal to each mirror and the plane of the closed path is at least about 2.5 degrees.

7. Apparatus as in claim 1, wherein said second fraction of a wavelength of said second retarding means is between approximately one-eighth to three-eighths of a wavelength.

8. Apparatus as in claim 1, wherein the second retarding means comprises a quarter wave retarder plate.

9. Apparatus as in claim 8, wherein the retarder plate is positioned so as to retard the radiation beam by about one-quarter wavelength per one-way pass in each direction therethrough, and thus to retard it by about one-half wavelength per two-way pass therethrough.

* * * * *